(12) United States Patent
Nissen et al.

(10) Patent No.: US 11,663,301 B2
(45) Date of Patent: May 30, 2023

(54) METHOD FOR LICENSING A TOOL CHAIN

(71) Applicant: dSPACE digital signal processing and control engineering GmbH, Paderborn (DE)

(72) Inventors: Matthias Nissen, Paderborn (DE); Guido Schaefergockel, Paderborn (DE)

(73) Assignee: dSPACE GmbH, Paderborn (DE)

( * ) Notice: Subject to any disclaimer, the term of this patent is extended or adjusted under 35 U.S.C. 154(b) by 107 days.

(21) Appl. No.: 17/400,759

(22) Filed: Aug. 12, 2021

(65) Prior Publication Data

US 2021/0374215 A1  Dec. 2, 2021

Related U.S. Application Data

(63) Continuation of application No. PCT/EP2020/052801, filed on Feb. 5, 2020.

(30) Foreign Application Priority Data

Feb. 12, 2019  (DE) .................... 10 2019 103 445.0

(51) Int. Cl.
*G06F 21/12* (2013.01)
*G06F 21/10* (2013.01)
(52) U.S. Cl.
CPC .......... *G06F 21/125* (2013.01); *G06F 21/105* (2013.01)
(58) Field of Classification Search
CPC .............................. G06F 21/125; G06F 21/105
USPC ....................................................... 713/190
See application file for complete search history.

(56) References Cited

U.S. PATENT DOCUMENTS

| 8,646,098 | B2 | 2/2014 | Vedantam et al. |
| 9,588,795 | B2 | 3/2017 | McWilliams et al. |
| 9,703,934 | B1 | 7/2017 | Karnik et al. |
| 9,977,880 | B2 | 5/2018 | Chambers et al. |
| 11,132,237 | B2 | 9/2021 | Cable et al. |
| 2011/0041125 | A1 | 2/2011 | Sugiura |
| 2013/0179984 | A1 | 7/2013 | Kumar et al. |
| 2014/0040343 | A1 | 2/2014 | Nickoiov et al. |

(Continued)

FOREIGN PATENT DOCUMENTS

| EP | 2284753 A2 | 2/2011 |
| EP | 2480966 B1 | 8/2012 |
| EP | 2955651 A1 | 12/2015 |

OTHER PUBLICATIONS

German Search Report dated Oct. 30, 2019 in corresponding application 10 2019 103 445.0.

(Continued)

*Primary Examiner* — Michael S McNally
(74) *Attorney, Agent, or Firm* — Muncy, Geissler, Olds & Lowe, P.C.

(57) ABSTRACT

A method for the usage-based licensing of one or more applications in a container, wherein the container comprises a license module, an application queries the presence of an application license via the license module and is only executed if an application license is present. In the license module, a linking of one or more application licenses with a unique identifier is stored, and the container comprises a settlement module, which retrieves a usage unit from an external license source. For the duration of an obtained usage unit, the settlement module provides the unique identifier in a secure data storage so that all applications linked with the unique identifier can be executed. A computer system and a computer program product are also provided.

10 Claims, 3 Drawing Sheets

(56) References Cited

U.S. PATENT DOCUMENTS

2015/0356279 A1  12/2015  Montana et al.
2018/0113999 A1   4/2018  Azmat

OTHER PUBLICATIONS

International Search Report dated Mar. 9, 2022 in corresponding application PCT/EP2020/052801.
Written Opinion of the International Searching Authority in corresponding application PCT/EP2020/052801.
Kuegler; "White Paper codemeter in Virtual Environments"; Dec. 31, 2016; XP055689090.
Wibu-Systems Ag; "CodeMeter/CmRuntime: Wibu Systems"; Jun. 30, 2017; XP055689133.
Wibu-Systems Ag; "CodeMeter License Models: Wibu Systems"; Jun. 30, 2017; XP055689148.

METHOD FOR LICENSING A TOOL CHAIN

This nonprovisional application is a continuation of International Application No. PCT/EP2020/052801, which was filed on Feb. 5, 2020 and which claims priority to German Patent Application No. 10 2019 103 445.0, which was filed in Germany on Feb. 12, 2019, and which are both herein incorporated by reference.

BACKGROUND OF THE INVENTION

Field of the Invention

The present invention relates to a method for usage-based licensing of one or more applications in a container, a computer system comprising an operating computer, a license server, and a plurality of working computers, as well as a computer program product.

Description of the Background Art

In the development of complex products, a large number of tests are required to ensure safe and reliable functioning. Since the costs for troubleshooting are higher the later an error is detected, components of motor vehicles, for example, such as control units in particular, are tested in a hardware-in-the-loop simulation before the entire product is completed. This involves simulating the physical system in real time and ensuring a correct response of the ECU but requires expensive real-time simulation computers and is also time-consuming. Increasingly, it is becoming possible to test numerous ECU functions without the presence of hardware. For example, the firmware of an ECU for processing sensor data in a motor vehicle can be tested by means of a "virtual test drive", wherein usually a large number of software applications interact to carry out the simulation.

A conclusive test of complex functions such as the autonomous guidance of a motor vehicle requires so much computing power that a large number of computers must be used simultaneously. For this purpose, a local cluster of computers can be kept available or rented from an infrastructure provider as part of cloud computing. The software applications for a test case are packaged in a container, such as a virtual machine, and, depending on need, run on numerous computers. For software manufacturers, this raises the question of how licensing for expensive and specialized software applications can be ensured in such a cloud environment.

Various approaches to licensing software in containers are known from the prior art, such as modifying common mechanisms to bind the software to a particular computer via one or more hardware features. In particular, it may be provided that a program running on the host operating system accesses the physical computer and makes the features obtained available to the virtual machines, usually with a limit on the number of virtual machines running simultaneously. One disadvantage of this approach is that it is too inflexible for applications in which the number of required computers fluctuate greatly.

Another approach to licensing is based on adapting the hypervisor or the cloud infrastructure; a particular disadvantage here is the lock-in to a specific provider or the requirement for a trusted cloud. For example, EP 2480966 B1, which corresponds to US 2011/0072431, discloses a method for usage-based licensing of applications in a virtual hypervisor run environment, in which multiple licensable components are combined when bootable machine images are created and weightings for the multiple licensable components are embedded as metadata. The hypervisor aggregates telemetric information and transmits it to a management framework, which uses the metadata to determine the usage for each component and to license the usage. In one embodiment, it is provided to assign initial usage units to an instance of the machine image. US 2014/0040343 A1 comprehensively describes a globally distributed computing cloud; a central management component enables the authentication of users and the collection of usage information.

US 2013/0179984 A1 discloses a method for controlling the execution of an application on a computer system, in which a license plan is created based on a given license. The license plan includes information about which user is allowed to execute the application in question. On the computer system, there is a license client that obtains the license plan from a license server. Based on the license plan, the license client decides whether a user may run the application. The license plan can have a limited validity period, wherein the validity period can be adjusted based on recorded usage data. U.S. Pat. No. 9,588,795 B2 discloses a method for monitoring resource allocation and logging usage in a virtualized environment, in which overuse of a license is detected and a secured report is generated, taking into account the different processing power of different processors.

SUMMARY OF THE INVENTION

It is therefore an object of the present invention to provide a method and a mechanism which enables flexible licensing of software applications in containers. In particular, usage-dependent licensing would be desirable, which is preferably also applicable in a private cloud.

Thus, according to an exemplary embodiment of the invention, a method is provided for the usage-based licensing of one or more applications in a container, the container comprising a license module, wherein an application queries the presence of an application license by means of the license module and is executed only if an application license is available. In the license module, a linking of one or more application licenses to a unique identifier is stored. The container comprises a settlement module which retrieves a usage unit from an external license source and provides the unique identifier in a secure data storage for the duration of an obtained usage unit. During this time, all applications whose application license is linked to the unique identifier can be executed.

The invention is applicable with various types of containers. For example, the container may be executed as a virtual machine comprising an operating system and running on virtual hardware; alternatively, the container may also access the mechanisms of the host operating system, for example, a docker container. Furthermore, the container can also be an image of an embedded system. The applications in the container check the presence of a license when a certain functionality is started or used. It is expedient that, from this point on, a renewed license check is carried out regularly, i.e., at fixed intervals, by the application, in particular having a period of one minute or shorter. The secure data storage can be implemented, for example, as a hidden file in the file system of the container, wherein the contents of the data storage are secured, in particular by encryption or signing, so that manipulation can be detected.

Advantageously, the method according to the invention enables a usage-based licensing of applications in a container, wherein a modification to the license model can be made without adaptation to the binary code of the individual applications: For single-user licensing, it is possible for the license module to access a hardware dongle, whereas for the licensing in the container this is replaced by the settlement module and the connection to a license source. The license source can be designed, for example, as a license server in a local network or as a cryptographically secured dedicated hardware module with counter. No trusted infrastructure or contract with a cloud provider is required for operation and secure settlement, but the license source can also be implemented as a metrics software module of a cloud infrastructure. The settlement module implemented as a separate component in the container can also be used independently of a virtualization. The licensing of an application via the unique identifier can thus be maintained independently of user-based settlement. By customizing the settlement module as an adapter, the currently implemented environment remains transparent for the individual software application. By separating the unique identifier, which enables the execution of a licensed application, from the presence and the concrete implementation of the retrieval of usage units, different license models can be implemented with little effort.

The unique identifier can be provided with a validity period and is no longer accepted after the validity period has expired. Preferably, the settlement module periodically retrieves new usage units as long as the container is being run; if no usage unit was obtained, the settlement module no longer provides a unique identifier or deletes the unique identifier from the data storage.

Conveniently, the retrieval of the usage units can occur at a predetermined period of time before the unique identifier expires. The settlement module does not have to be linked to the applications by (complex) dedicated mechanisms but can retrieve a new usage unit in a time-controlled manner and update the expiration time of the unique identifier or extend it by the duration of the retrieved and obtained usage unit. The duration or the time interval until the unique identifier expires can be selected within certain limits and can be a few minutes, for example. For example, the settlement module could retrieve a usage unit every minute, with the unique identifier being valid for a maximum of three minutes in each case. Thus, a short-term network interruption does not cause problems when running the toolchain, while at the same time, in the event of a bypass attempt, application overuse is limited to a few minutes.

The settlement module can accept a retrieved usage unit as an obtained usage unit only if the external license source authenticates itself as trustworthy. This can be done on the basis of a previously agreed key, for example in a challenge-response protocol or on the basis of a signature authentication.

The external license source can log retrieved usage units so that a pre-provided credit is reduced and/or the number of usage units consumed are calculated. It is also useful to provide a breakdown of the settlement if multiple sets of software applications are defined, with the settlement containing in particular an overview of the duration of use for the individual sets of applications and the price associated with each.

The license module or a secure data area of the license module can include multiple sets of links, wherein a first set of application licenses is linked to a first unique identifier and a second set of applications is linked to a second unique identifier, wherein the settlement module retrieves a first usage unit or a second usage unit from the external license source, and wherein the settlement module provides the first or second unique identifier depending on the usage unit retrieved and obtained. By means of a simple adjustment of the set of software applications stored in the data storage—without modifying the binary code of the individual software application—a wide variety of toolchains can be defined, or a wide variety of applications can be supported in a simple manner.

It can also be provided that the secure data storage can or does comprise multiple unique identifiers; the settlement module can thus request multiple usage units in parallel and provide multiple identifiers in parallel according to the usage units obtained. This allows for multiple toolchains to be executed simultaneously, wherein the usage units can be requested in a synchronized or time-offset manner.

The invention further relates to a computer system comprising an operating computer having a human-machine interface, a license server as a license source, and a plurality of working computers. Each working computer comprises a processor, a working memory, and an interface, and is set up to execute a method according to the invention. The license server can be executed like a license server known per se in the local network (also known as floating network license). However, other license server versions are also conceivable, as long as secure storage of usage is guaranteed—such as in the form of a Trusted Platform Module.

Usage units may have a very long (e.g., one year) or unlimited validity. In this case, the retrieval of usage units can be used to count the number of computers running a software component. Thus, the license server would count software activations instead of runtime. In this case, it may also be provided to permit a limited number of software component activations. If a specified maximum number is exceeded, a manual check must be appropriately performed. This means that automatic licensing can also be performed, for example, for computers that are not connected to the network for longer periods. Thus, a software component may be delivered with subsequent on-demand licensing.

Further, the invention relates to a computer program product having a computer-readable storage medium on which are embedded instructions that, when executed by a computing unit, cause the computing unit to be set up to execute a method according to the invention.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
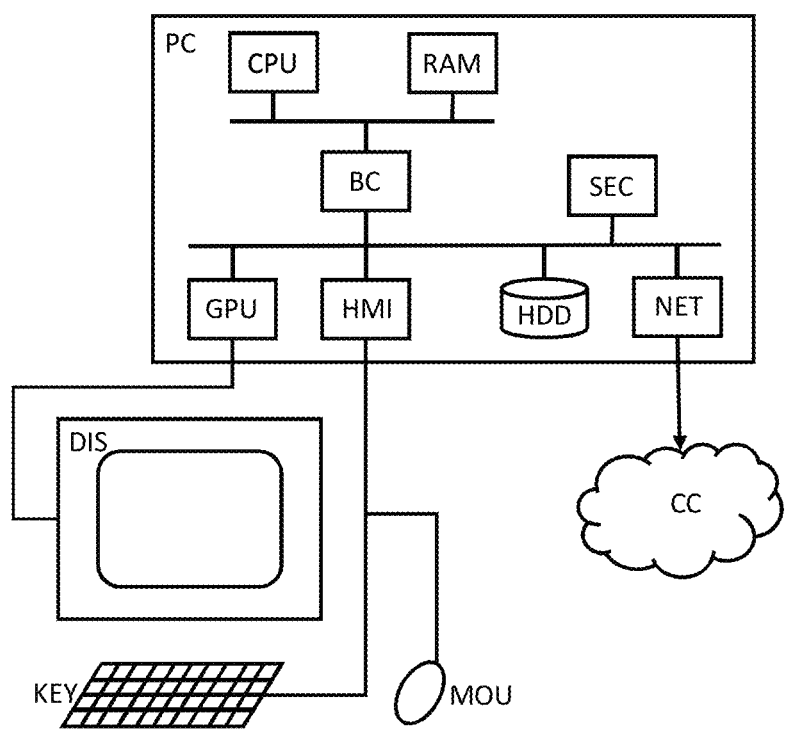
FIG. 1 shows an exemplary embodiment of an operating computer.

FIG. 1 shows an exemplary embodiment of an operating computer PC. This comprises a processor CPU, which can be implemented in particular as a multi-core processor, a main memory RAM and a bus controller BC. Preferably, the operating computer PC can be designed to be manually operated directly by a user, wherein a monitor DIS is connected via a graphics card GPU, and a keyboard KEY and a mouse MOU are connected via a peripheral interface HMI. In principle, the operating computer PC could also have a touch interface. The operating computer further comprises a non-volatile data storage HDD, which can be designed in particular as a hard disk and/or solid state disk, and an interface NET, in particular a network interface. Further computers, such as in particular a cluster of computers CC, can be connected via the interface NET. In principle, one or more arbitrary interfaces, in particular wired interfaces, are available on the operating computer PC and can each be used for connection to further computers. Suitably, a network interface in accordance with the Ethernet standard can be used, wherein at least the physical layer is designed standards-compliant, or several higher protocol layers can also be implemented proprietarily or adapted to the operating computer. The interface NET can also be implemented wirelessly, such as in particular as a WLAN interface or according to a standard such as Bluetooth. It can also be a mobile radio connection such as LTE, wherein preferably the exchanged data are encrypted. It is advantageous if at least one interface of the operating computer is a standard Ethernet interface, so that other computers can be easily connected to the operating computer PC.

Preferably, the operating computer PC can have a secure data container SEC. On the one hand, this enables the use of licensed applications on the operating computer itself, but on the other hand it also enables the operating computer to be used as a license server, wherein settlement data are stored in the secure data container. This can be implemented, for example, in the form of a dongle, which can be connected in particular to a peripheral interface. Alternatively, it can also be provided to integrate a secure data container SEC permanently in the operating computer as a component or to store it in the form of a file on the non-volatile data storage HDD, wherein the contents are suitably protected against unauthorized access or manipulation by mechanisms of the operating system and/or by a suitable management utility.

Figure 2:
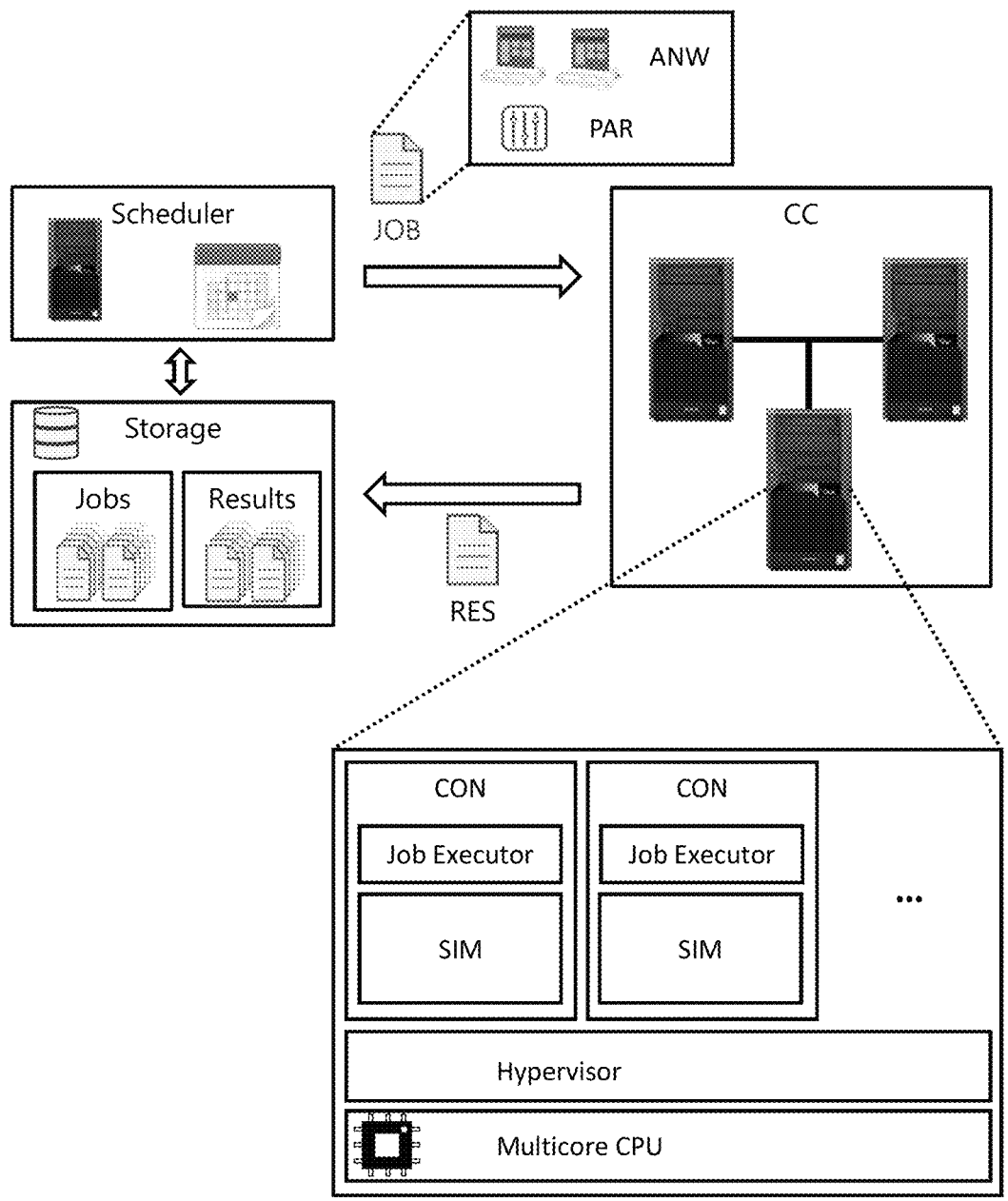
FIG. 2 shows a schematic view of a simulation in a cluster.

FIG. 2 shows a diagram for running a variety of tests on a computer cluster CC. On the operating computer there is a scheduler, which allows for a choice of runtimes, run priorities and sequences of the individual applications or of the different toolchains. This submits various jobs JOB to the computer cluster CC, wherein a job comprises the applications to be executed and the required data or parameters PAR, such as stimuli required for the simulation. The computers of the computer cluster CC are expediently set up for the parallel execution of several containers CON, such as virtual machines in particular, by executing a hypervisor on the processor, in particular a multicore CPU, of the individual computer. Preferably, the container CON comprises a job executor, which starts the desired software applications or toolchains on the basis of the submitted jobs and supplies them with the required data. One of the software applications executed can, for example, be a simulation environment SIM in which virtual ECUs or various encapsulated models are executed. The job executor logs the results RES and sends them after successful execution to a data memory Storage which can in particular also be arranged in the operating computer. The executed requests or jobs and the results obtained can be stored in the data memory Storage and made available for later evaluation.

Figure 3:
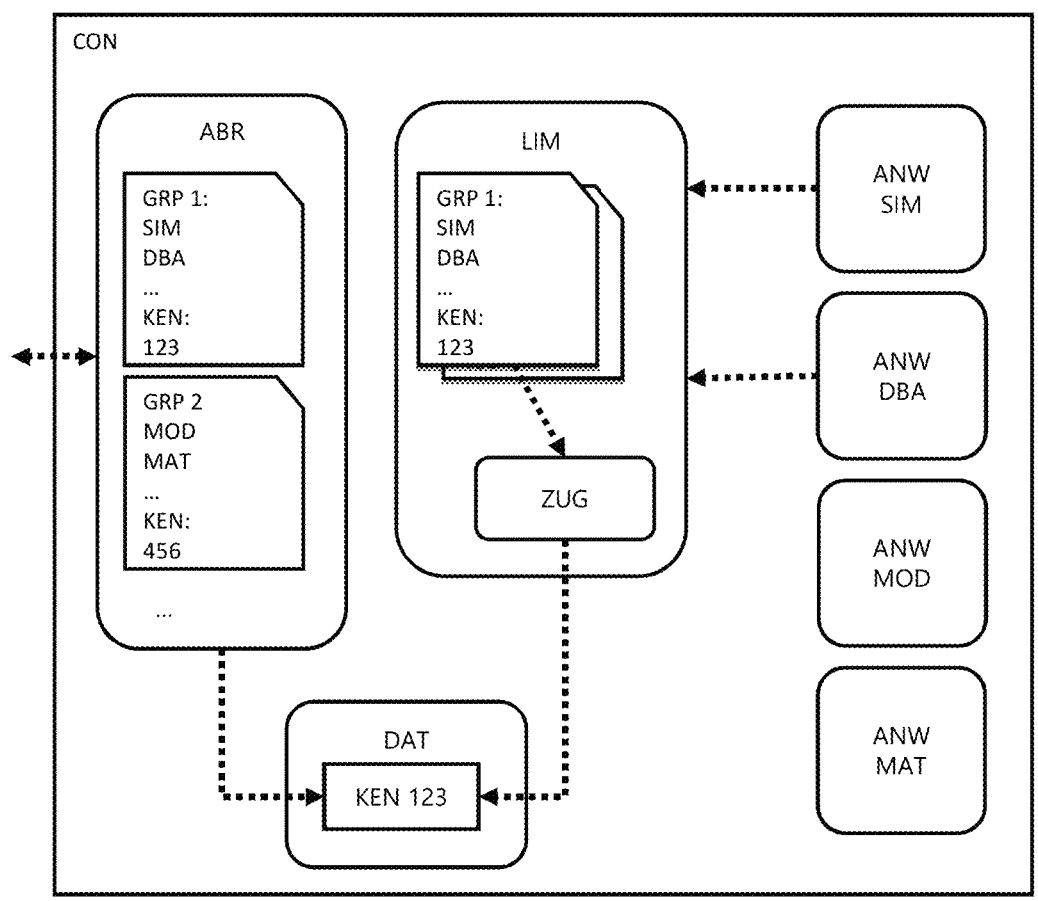
FIG. 3 shows an exemplary embodiment of a container.

FIG. 3 shows an exemplary embodiment of a container according to the invention.

The container CON comprises a basically arbitrary number of licensed software applications ANW, of which a simulation environment SIM, a database DBA, an environment model MOD, and a technical computing environment MAT are shown here as examples. The various applications ANW SIM, DBA, MOD and MAT are set up to query the presence of an application license via a license module LIM. Only if a license is available for the corresponding application will it be executed at all or with all features. In combination with a commercially available dongle, the applications could be executed on a single standard PC without any changes to the binary code. The license module LIM comprises a protected data area in which a link between several application licenses is stored with a unique identifier. The storing can also be done by including a signed plug-in for an application interface of the license module, wherein in the plug-in one or more sets of applications are defined and associated with a unique identifier. For example, a set of applications GRP1 can be defined, which includes the simulation environment SIM and the database DBA and is linked with the unique identifier KEN 123. Via an access module ZUG, the license module can access a secure data storage DAT, which contains any number of unique identifiers. The access module may include a decryption component and/or a timestamp verification component. In particular, the secured data storage DAT may be stored as an encrypted file in the file system, wherein access to the information is only possible, for example, with knowledge of the key, and/or the authenticity of the content is verified using a signature.

Furthermore, the container CON includes a settlement module ABR, which, in a protected data area, also contains the linking of a number of applications to a unique identifier. For example, a first toolchain GRP1 may include, as applications, the simulation environment SIM and the database DBA and be associated with a first unique identifier KEN 123, while a second toolchain GRP2 may include as applications the environment model MOD and the computing environment MAT and may be linked with a second unique identifier KEN 456.

The settlement module can be connected via a data link, in particular a network connection with a license source not shown here. Depending on the setting or demand, it will thereby request a usage unit for the first toolchain and/or the second toolchain. The setting can, for example, be made via a configuration file, or the settlement module could be queried with a parameter displaying the demand. If the license source authenticates itself to the settlement module (for example, by means of a challenge-response procedure) and this obtains a usage unit, then the settlement module provides the corresponding unique identifier(s) in the secure data area DAT; here, the first unique identifier KEN 123 is shown by way of example.

If the simulation environment SIM is started, it checks the presence of an application license via the license module. The unique identifier KEN 123 is stored in the secure data storage DAT. By means of the list of links stored in the protected data area of the license module, the license module recognizes that an existing unique identifier KEN 123 indicates an application license for the simulation environment SIM. After release by the license module, the simulation environment can be executed; it is expedient to periodically check that the unique indicator is still present. The settlement module periodically retrieves new usage units (not necessarily with the same period); if no usage unit is obtained, the settlement module removes the unique identifier (for example, by deleting from a file or by overwriting the secure data storage with zero values).

It is expedient to check for the presence of an application license each time an application is started. In the case of the example shown, the database DBA can be executed in addition to the simulation environment SIM. On the other hand, a query for the modeling environment MOD would show that no application license is available because it is not linked to the unique indicator KEN 123.

The invention enables the licensing of toolchains of multiple, individual applications with existing dongle licensing without having to make any changes to the binary code of the individual applications. By adapting the settlement module, which acts as an adapter between the container and the outside world, various license sources can be used. In this case, the possibility of executing the toolchain in the container is licensed or settled, which means that simple usage-based licensing can be provided for complex applications.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for a usage-based licensing of one or more applications in a container, the method comprising:
    querying, by an application of a first set of applications in the container, a presence of an application license for the application via a license module included in the container, the license module determining the presence of the application license based on a presence of a first unique identifier associated with the first set of applications in a secured data storage of the container;
    executing the application only if a result of the querying indicating the presence of the application license;
    retrieving a first usage unit regarding the first set of applications from an external license source via a settlement module included in the container; and
    providing, by the settlement module, the first unique identifier in the secured data storage for a duration of the first usage unit.

2. The method according to claim 1, wherein the first unique identifier is provided with a validity period and is no longer accepted by the license module after the validity period has expired.

3. The method according to claim 2, wherein the settlement module periodically retrieves new usage units as long as the container is being executed, and wherein the settlement module ceases to provide the first unique identifier when no usage unit is retrievable.

4. The method according to claim 1, wherein the settlement module accepts a usage unit from the external license source as the first usage unit only if the external license source authenticates as trustworthy.

5. The method according to claim 1, wherein the external license source logs retrieved usage units such that a preprovided credit is reduced and/or settlement is performed based on a number of usage units used.

6. The method according to claim 1, wherein the external license source is designed as a license server on a local area network, a cryptographically secured hardware module, or a metrics software module of a cloud infrastructure.

7. The method according to claim 1, further comprising: retrieving a second usage unit regarding a second set of applications in the container from the external license source via the settlement module, and
    providing by the settlement module a second unique identifier in the secured data storage for a duration of the second usage unit.

8. The method according to claim 7, wherein the settlement module requests multiple usage units in parallel and, according to retrieving one or more of the multiple usage units, provides corresponding one or more of multiple unique identifiers in the secure data storage.

9. A computer system comprising:
    a license server as a license source; and
    an operating computer comprises a processor configured to execute a container, a memory coupled with the processor, and a network interface coupled with the processor, the processor being configured to, when the container is being executed:
    query, by an application of a first set of applications in the container, a presence of an application license for the application via a license module included in the container, the license module determining the presence of the application license based on a presence of a first unique identifier associated with the first set of applications in a secured data storage of the container;
    execute the application only if a result of the querying indicating the presence of the application license;
    retrieve a first usage unit regarding the first set of applications from the license server via a settlement module included in the container, the license server being coupled with the network interface of the operating computer via a network connection; and
    provide, by the settlement module, the first unique identifier in the secured data storage for a duration of the first usage unit.

10. A non-transitory computer-readable storage medium on which instructions are embedded that, when executed by a processor, cause the processor to execute a container and to, when the container is being executed:
    query, by an application of a first set of applications in the container, a presence of an application license for the application via a license module included in the container, the license module determining the presence of the application license based on a presence of a first unique identifier associated with the first set of applications in a secured data storage of the container;
    execute the application only if a result of the querying indicating the presence of the application license;
    retrieve a first usage unit regarding the first set of applications from an external license source via a settlement module included in the container; and
    provide, by the settlement module, the first unique identifier in the secured data storage for a duration of the first usage unit.

* * * * *